United States Patent
Evans

[15] 3,650,543
[45] Mar. 21, 1972

[54] MUD FLAP STRUCTURE

[72] Inventor: James P. Evans, Oklahoma City, Okla.

[73] Assignees: Polly E. Trindle; Mary Kathryn, both of Oklahoma City, Okla., part interest to each

[22] Filed: May 13, 1970

[21] Appl. No.: 36,941

[52] U.S. Cl. .................................. 280/154.5, 248/316
[51] Int. Cl. ............................................. B62d 25/16
[58] Field of Search ............ 280/154.5; 248/360, 305, 316 R; 24/243 R

[56] References Cited

UNITED STATES PATENTS

| | | | |
|---|---|---|---|
| 3,158,386 | 11/1964 | Tillinghast | 280/154.5 |
| 714,348 | 11/1902 | Youngblood | 248/316 B |
| 3,285,624 | 11/1966 | Aber et al. | 280/154.5 |
| 3,219,363 | 11/1965 | Dalsey et al. | 280/154.5 |

Primary Examiner—Benjamin Hersh
Assistant Examiner—Robert R. Song
Attorney—Dunlap, Laney, Hessin & Dougherty

[57] ABSTRACT

A mud flap structure which includes a first bent plate having a downwardly depending skirt, a second bent plate pivotally connected to the first plate and having a downwardly depending skirt which is spaced from the downwardly depending skirt of the first plate and defines a flap receiving channel therewith. The downwardly depending skirt portions of the first and second plates carry cooperating holes and dimples which function to frictionally retain a flexible mud flap between the plates when the upper portion of the mud flap is passed into the channel between the downwardly depending portions of the plates, and the plates are drawn toward each other by means of a plurality of bolts extended through the plates but not through the mud flap.

9 Claims, 4 Drawing Figures

Patented March 21, 1972
3,650,543
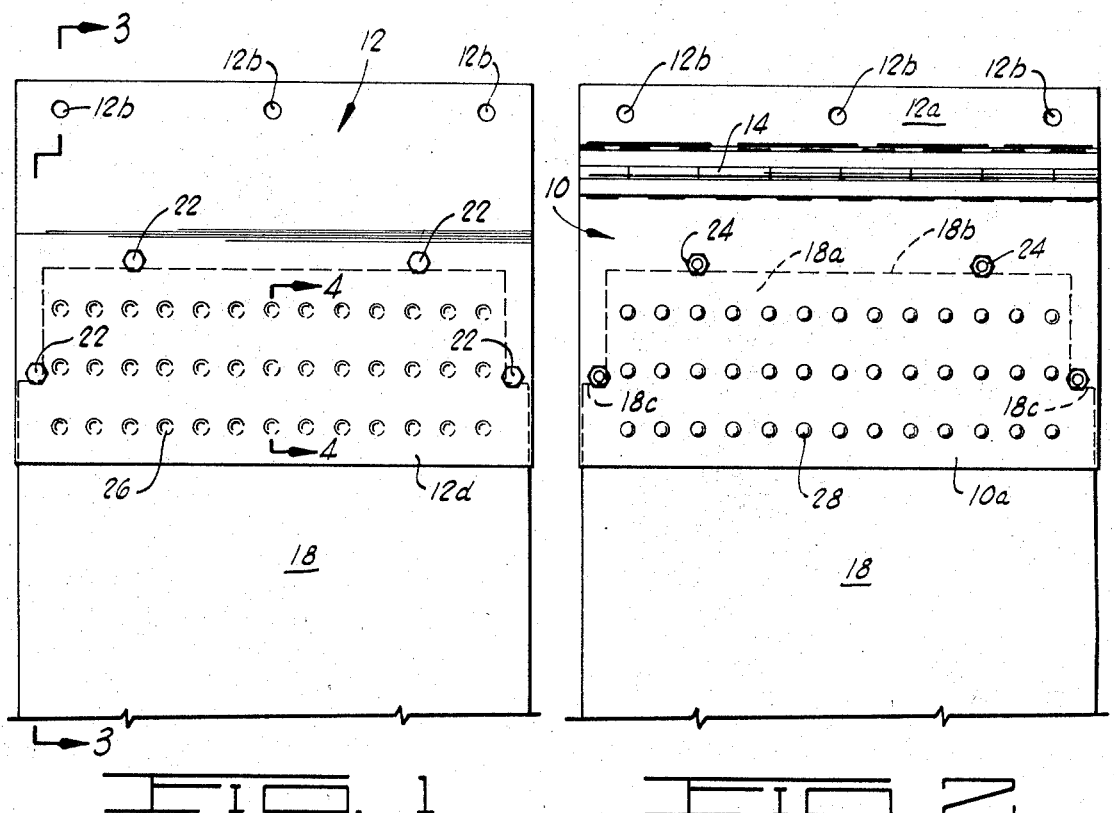
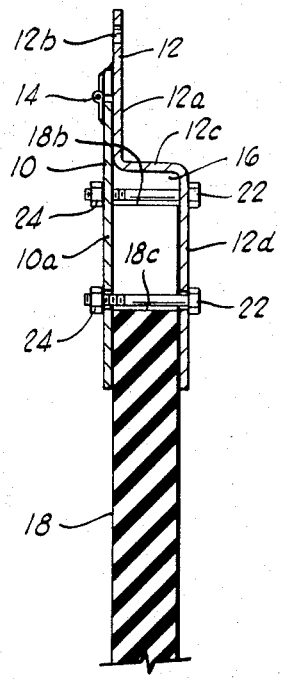
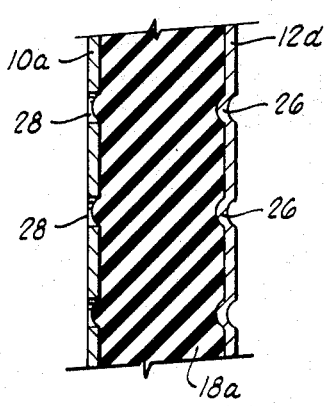
INVENTOR
JAMES P. EVANS
BY
ATTORNEYS

MUD FLAP STRUCTURE

FIELD OF THE INVENTION

This invention relates to mud flaps for use on vehicles, and more particularly, to mud flaps of the type which can be pulled free of their anchorage without damaging or tearing the mud flap.

BRIEF DESCRIPTION OF THE PRIOR ART

It has heretofore been proposed to provide mud flaps which will not be damaged in the eventuality that the mud flap is caught between the wheel of a vehicle on which the mud flap is carried and a stationary obstruction against which the wheel of the vehicle is backed, such as during backing up to a loading dock or the like. Damage to the mud flap has been obviated in prior arrangements by permitting the flexible portion of the flap to be pulled free from the anchoring structure from which it is suspended without ripping or tearing. This has been accomplished by providing a yielding frictional engagement between the flap and the anchoring structure which is overcome as force is applied to the flap tending to pull it free of the anchoring structure.

In U.S. Pat. Nos. 3,219,363 and 3,158,386, the mud flap is retained in position by providing a bead adjacent its upper edge which is engaged by flanges or plates, but which, due to the resiliency of the material of which the flap is constructed, can undergo compression and resilient deformation to permit the flap to be pulled free of these flanges or plates when the flap is stressed by being pinched between a tire of the vehicle carrying the flap and some stationary obstruction.

BRIEF DESCRIPTION OF THE PRESENT INVENTION

This invention relates to a mud flap for use on trucks and other wheeled vehicles, which mud flap is frictionally retained in an anchoring structure in such a way that the mud flap can be pulled free from this anchoring structure without damage thereto when forces tending to pull the mud flap downwardly with respect to the ground are applied thereto.

Broadly described, the present invention comprises a flexible and resilient flap of material which has an upper edge portion frictionally retained in an anchoring structure. The anchoring structure includes a pair of plates, each of which have a downwardly depending skirt portion, and which are configured so as to provide between the downwardly depending skirt portions of the two plates, a channel for receiving the upper portion of the flexible mud flap. The downwardly depending skirt portions of the two plates carry cooperating apertures and dimples which enhance the frictional engagement of the plates with the upper portion of the mud flap. Moreover, the downwardly depending skirt portions of the two plates are drawn towards each other against the intervening upper portion of the mud flap by a plurality of bolts which are extended between the skirt portions of the plates to permit these portions to be drawn towards each other and against the flap when nuts are tightened on the bolts.

An object of the present invention is to provide a mud flap construction which permits the resilient flexible portion of the mud flap to be pulled free of an anchoring structure without damage to the mud flap at such time as the flap is stressed during usage.

Another object of the invention is to provide a resilient flexible mud flap which can be quickly and easily mounted in an anchoring structure which is provided on a vehicle upon which the mud flap is to be mounted.

A further object of the invention is to provide a flexible mud flap structure which facilitates the detachment and replacement of the flexible and resilient portion of a flexible and resilient mud flap from an anchoring structure in an expeditious manner.

A further object of the invention is to provide a mud flap structure for securement to vehicles, which structure includes a flexible and resilient portion which can be pulled free of its anchoring structure without damage at such time as the flap may be pinched between a rotating wheel of the vehicle and an obstruction against which the wheel is backed, but which will not come loose from the anchoring structure as a result of an accumulation of ice or mud on the flexible and resilient portion of the flap.

Other objects and advantages of the invention will become apparent as the following detailed description of the invention is read in conjunction with the accompanying drawings which illustrate the invention.

BRIEF DESCRIPTION OF THE DRAWINGS

FIG. 1 is a rear elevation view of a mud flap structure constructed in accordance with the present invention.

FIG. 2 is an elevation view showing the opposite side of the mud flap structure depicted in FIG. 1 from that which is there visible.

FIG. 3 is a sectional view taken along line 3—3 of FIG. 1.

FIG. 4 is a sectional view taken along line 4—4 of FIG. 1.

DETAILED DESCRIPTION OF A PREFERRED EMBODIMENT OF THE INVENTION

Referring to the drawings, shown therein are a pair of cooperating plates 10 and 12. As will be perceived in referring to FIG. 3, the plate 10 is a relatively straight or monoplanar plate, whereas the plate 12 is bent through two 90° angles in a generally S-shaped configuration and has an upper portion 12a having attachment holes 12b provided adjacent the upper edge thereof. The plate 12 further has a web portion 12c which connects the upper plate portion 12a with a downwardly depending skirt portion 12d. A downwardly depending skirt portion 10a also may be said to characterize the plate 10. The plate 10 is secured to the upper portion 12a of the plate 12 by means of a suitable hinge 14. It will be noted in referring to FIG. 2 that the hinge 14 extends across the plates at a location below the holes or apertures 12b formed adjacent the upper edge of the plate 12.

With the plates in the configuration described, the skirt portions 10a and 12d define between them a downwardly opening channel 16. The mud flap construction of the invention includes a flexible resilient flap 18 which projects downwardly from the anchoring structure constituted by the plates 10 and 12. The flap 18 includes an upper portion 18a which is projected between the plates 10 and 12 and which has an upper edge 18b and a pair of shoulders 18c formed at opposite sides of the upper portion 18a of the flap.

At the locations best illustrated in FIGS. 1 and 2, a plurality of bolts 22 are extended through aligned holes in the skirt portions 10a and 12d of the plates 10 and 12, respectively, and are secured by nuts 24. It will be seen that two of the bolts 22 bear against the shoulders 18c formed at the sides of the flap 18. It will also be perceived that the upper edge 18b of the upper portion 18a of the flap 18 bears against the two upper bolts 22 so that when the flap 18 is positioned in the manner described, it necessarily has its upper edge 18b aligned with the horizontal axis and depends from the anchoring structure constituted by the plates 10 and 12 in a manner to act as a shield with respect to a wheel provided on the vehicle which carries the mud flap structure.

In referring to FIGS. 1 and 2, it will be noticed that the skirt portion 12d of the plate 12 has formed therein, a plurality of dimples 26. The dimples 26 formed in the skirt portion 12d of the plate 12 are aligned in a horizontal sense with a plurality of apertures or openings 28 formed in the skirt portion 10a of the plate 10.

FUNCTION AND OPERATION

In the use and operation of the mud flap structure of the invention, the plates 10 and 12 are secured to each other by a hinge connection constituted by the hinge 14 in the manner best illustrated in FIGS. 1–3. The upper portion 12a of the plate 12 is then secured by bolts, screws or other suitable means, to a vehicle on which the mud flap structure is to be located, it being well known in the art as to the position which should be occupied by the flexible flap 18 when the mud flap structure is properly mounted. For the facilitation of mounting of the anchoring structure constituted by the plates 10 and 12 on the vehicle, the apertures or openings 12b are formed in the upper portion 12a of the plate 12 and can be used for accommodating the bolts or screws.

With the anchoring structure constituted by the plates 10 and 12 secured on the vehicle in the manner described, and with the bolts 22 loosened, the skirt portions 10a and 12d of the two plates can then be pivoted apart to enlarge the channel 16 and permit the upper portion 18a of the flap to be inserted between the two downwardly depending skirt portions 10a and 12d of the assembly. The bolts 22 serve to guide and position the flap 18 in the proper location. When the flap 18 has been positioned with the shoulders 18c bearing against the bolts 22 located nearest the opposite side edges of the plates 10 and 12, and with the upper edge 18b of the flap 18 bearing against the uppermost bolts 22, the nuts 24 on the bolts are then tightened to draw the skirt portions 10a and 12d toward each other. This narrows the width of the channel 16, and compresses the upper portion 18a of the flap 18 between the skirt portions 10a and 12d. As the skirt portions 10a and 12d are drawn toward each other by tightening the nuts 24, the dimples 26 formed in the skirt portion 12d of the plate 10 tend to displace the resilient material of the flap 18 so that a firm frictional engagement is attained between the flap and the plate 12.

With compression of the upper portion 18a between the skirt portions 10a and 12d of the plates 10 and 12, the resilient material of the flap also tends to be displaced into the holes or apertures 28 formed in the skirt portion 10a of the plate 10. This provides further frictional engagement between the flap 18 and the anchoring structure. The effect of the inclusion of the dimples 26 and apertures 28 in the plates 12 and 10, respectively, is to firmly secure the flap 18 between the skirt portions 10a and 12b of the plates and prevent loss of the flap at such time as it may become encaked with mud or ice during use of the vehicle.

At such time as the vehicle may be backed against an obstruction so that either of the flaps 18 over either rear wheel is caught or pinched between such obstruction and the wheel, the flap may be forced out of its anchoring structure without destruction or damage. This occurs as a result of the stressing of the flap to exert a downward force on the flap tending to pull the upper portion 18a thereof out of the channel 16 formed between the skirt portions 10a and 12d of the plates 10 and 12. It will be noted that none of the bolts 22 extend through the flaps 18, and thus do not cause the flap to be ripped or torn as is the case with most prior types of mud flap structures. Rather, the frictional engagement which is afforded by the contacting plates 10 and 12, and more especially, by the cooperating dimples 26 and apertures or openings 28, is sufficiently yielding that when forces of the magnitude encountered are exerted upon the flaps 18, the flaps will be pulled from between the plates 10 and 12 without any damage whatsoever. It is then possible to reinsert the flaps at a later time without the need for replacement with new flaps.

Although a specific embodiment of the invention has been herein described in order to provide an illustration of the manner in which the invention is to be practiced, it is to be understood that various changes and modifications can be made in the described structure without departure from the basic principles of the invention. Changes and innovations of this type are therefore deemed to be circumscribed by the spirit and scope of the invention except as the same may be necessarily limited by the appended claims or reasonable equivalents thereof.

What is claimed is:

1. A mud flap structure comprising:
    a first plate having dimples therein;
    a second plate connected to said first plate and defining therewith an open-sided channel, said second plate having holes located substantially opposite the dimples in said first plate;
    a flexible flap partially positioned in said channel between said first and second plates and extending from said first and second plates; and
    bolt means passing through said first and second plates clear of said flexible plate in a direction to draw said plates toward each other against said flap, the dimples in said first plate protruding from the side thereof adjacent the portion of said flap between said first and second plates.

2. A mud flap structure as defined in claim 1 wherein said first plate includes:
    an upper portion;
    a web portion extending substantially normal to said upper portion; and
    a downwardly depending skirt portion extending substantially normal to said web portion and substantially parallel to said upper portion, said skirt portion being spaced from said second plate to define said open-sided channel.

3. A mud flap structure as defined in claim 2 wherein said second plate is pivotally connected to the upper portion of said first plate to facilitate enlargement of said channel.

4. A mud flap structure as defined in claim 1 wherein said bolt means includes a plurality of bolts defining a single location at which a portion of said flap may be positioned in said channel between said plates.

5. A mud flap structure as defined in claim 4 wherein said flap has a pair of shoulders formed thereon and bearing against a pair of said bolts when said portion of said flap is in said single location.

6. A mud flap structure as defined in claim 3 wherein said second plate is a substantially monoplanar structure and is pivotally connected to said first plate by a hinge for pivotation about an axis extending substantially parallel to said web portion.

7. A mud flap structure as defined in claim 6 wherein the holes in said second plate are in alignment with the dimples in said first plate.

8. A mud flap structure as defined in claim 7 wherein said bolt means includes a plurality of bolts defining a single location at which a portion of said flap may be positioned in said channel between said plates.

9. A mud flap structure as defined in claim 8 wherein said flap has a pair of shoulders formed thereon and bearing against a pair of said bolts when said portion of said flap is in said single location.

* * * * *